United States Patent

McFadden et al.

Patent Number: 5,975,744
Date of Patent: Nov. 2, 1999

[54] REAL-TIME COMPENSATION SYSTEM AND METHOD

[75] Inventors: Seamus McFadden, Bristol; Raymond J Chaney, Berkeley, both of United Kingdom

[73] Assignee: Renishaw plc, Gloucestershire, United Kingdom

[21] Appl. No.: 08/680,031

[22] Filed: Jul. 15, 1996

[30] Foreign Application Priority Data

Jul. 13, 1995 [GB] United Kingdom ............... 9514321

[51] Int. Cl.⁶ ............................................. G06F 19/00
[52] U.S. Cl. .......................... 364/474.08; 364/474.35
[58] Field of Search .................. 364/468.08, 474.28, 364/474.29, 474.3, 474.31, 474.33, 474.34, 474.35, 167.01, 557.04, 550, 560–566, 551.01, 551.02; 318/611, 601–604, 615–618, 628, 632, 561

[56] References Cited

U.S. PATENT DOCUMENTS

| | | | |
|---|---|---|---|
| 5,083,280 | 1/1992 | Yamamoto et al. | 364/474.3 |
| 5,095,788 | 3/1992 | Matoni | 364/474.37 |
| 5,101,146 | 3/1992 | Teshima | 318/572 |
| 5,375,066 | 12/1994 | Yee et al. | 364/474.35 |

FOREIGN PATENT DOCUMENTS

| | | |
|---|---|---|
| A-1-0334541 | 9/1989 | European Pat. Off. . |
| A-369-020 | 5/1990 | European Pat. Off. . |

OTHER PUBLICATIONS

National Institute of Standards and Technology Publication, U.S. Dept. of Commerce, Oct. 1990, NISTIR 4447, "Implementing Fast Part Probing and Error Compensation on Machine Tools", Kenneth W. Yee et al., pp. 1–11, 13 total pages.

National Institute of Standards and Technology Publication, U.S. Dept. of Commerce, Apr. 1992, NISTIR 4832, "Alternative Designs of a Real–Time Error Corrector for Machine–Tools with "Encoder" Position Feedback", Kenneth W. Yee, pp. 1–13, 15 total pages.

National Institute of Standards and Technology Publication, U.S. Dept. of Commerce, Jun. 1992, NISTIR 4854, "Automated Compensation of Part Errors Determined by In–Process Gauging", Kenneth W. Yee et al., pp. 1–18, 20 total pages.

*Primary Examiner*—Reba I. Elmore
*Assistant Examiner*—Thomas E. Brown
*Attorney, Agent, or Firm*—Oliff & Berridge, PLC

[57] ABSTRACT

A laser interferometer measuring system generates a series of digital output quadrature pulses corresponding to movement of a retroreflector 18. The output pulses are intended for receipt by a master counter containing an incremental count corresponding to displacement of the retroreflector 18. Errors present in the output pulses due to environmental or geometrical error sources in the interferometer may be compensated for by scaling the output pulses in accordance with a correction factor K. The output pulses are stored in a first counter 30, 130; a series of secondary pulses, being either the output pulses as scaled, or independently generated by a signal generator 200, are sent both to the master counter and a second counter 80, 180. A processor 50, 150 continually monitors the value of the second counter, and compares this with an actual value of displacement, equal to the product of the correction factor and the instantaneous value of the first counter. The frequency of secondary pulses transmitted to the master counter and the second counter is continually controlled by the processor in order to equalize the value of the second counter with the actual displacement value.

11 Claims, 2 Drawing Sheets

REAL-TIME COMPENSATION SYSTEM AND METHOD

BACKGROUND OF THE INVENTION

1. Field of the Invention

The invention relates to a real-time compensation system and a real-time compensation method for use with a measuring apparatus.

Laser measuring apparatus are known per se, and typically include an interferometer which combines a reference beam, reflected from a stationary retroreflector, and a measuring beam reflected from a moving retroreflector, to generate interference which may be made manifest at a photodetector. Displacement of an object to which the moving retroreflector is connected may be measured by generating an incremental count from the output of the photodetector. In practice a plurality of photodetectors may be provided which, in conjunction with suitable signal processing electronics, generate a pair of digital quadrature pulses, thereby to generate information on both the magnitude and direction of movement of the object to which the movable retroreflector is connected. It is also known to provide one or more environmental sensors, which generate signals corresponding to values of, for example, ambient air temperature, air pressure, humidity, and so on. These signals may be used to correct measurements made with the laser.

2. Description of Related Art

EP 334541 discloses an error compensation system for a CNC machine tool in which positioning errors arise when a movable body is positioned by a servo. U.S. Pat. No. 5,375,066 discloses error correction to a machine tool in real time to correct fixed geometric errors, or thermally induced errors. This subject is also addressed in the following publications of the U.S. Department of Commerce National Institute of Standards and Technology NISTIR 4854, 4447 and 4832.

SUMMARY OF THE INVENTION

It is desirable to perform such compensation in real-time. The present invention provides a real-time compensation system for a measuring apparatus, which apparatus generates a series of digital output pulses corresponding to movement of an object whose displacement is to be measured, the compensation system producing compensated pulses for transmission to a master counter containing an corrected displacement value of said object, the system comprising: a first counter, which receives said output pulses, and generates therefrom a first incremental value corresponding to an uncorrected displacement of said object relative to a datum; a processor which receives a sensor signal from at least one sensor, and generates a correction factor based upon the value of said at least one sensor signal; a secondary pulse generator which generates secondary digital pulses for transmission to said master counter; a second counter, which receives said secondary pulses, and generates therefrom a second incremental value corresponding to said corrected displacement of said object relative to said datum; wherein said processor is adapted (a) to calculate the actual displacement of said object from the uncorrected displacement value of said first counter, and the instantaneous value of said at least one correction factor; (b) to compare said calculated actual displacement with the corrected displacement value of said second counter, and to control the instantaneous frequency at which said secondary pulses are transmitted to said master counter and said second counter, in accordance with the difference, if any, between said calculated actual displacement and the corrected displacement value of said second counter, thereby to equalise said corrected displacement value of said second counter with said actual displacement value.

In one preferred embodiment, the secondary pulse generator is provided by a signal generator producing a constant frequency secondary pulse train, and a gate controlled on the basis of signals from the processor controls the instantaneous frequency of secondary pulses transmitted to the second and master counters.

In a further preferred embodiment, the secondary pulses are provided by a scaler or multiplier circuit by scaling or multiplying the output pulses by the correction factor; the instantaneous frequency of secondary pulses being controlled by the processor, which effectively suppresses the emission of secondary pulses, or injects additional secondary pulses.

BRIEF DESCRIPTION OF THE DRAWINGS

Embodiments of the invention will now be described, by way of example, and with reference to the accompanying drawings in which.

DESCRIPTION OF PREFERRED EMBODIMENTS

Figure 1:
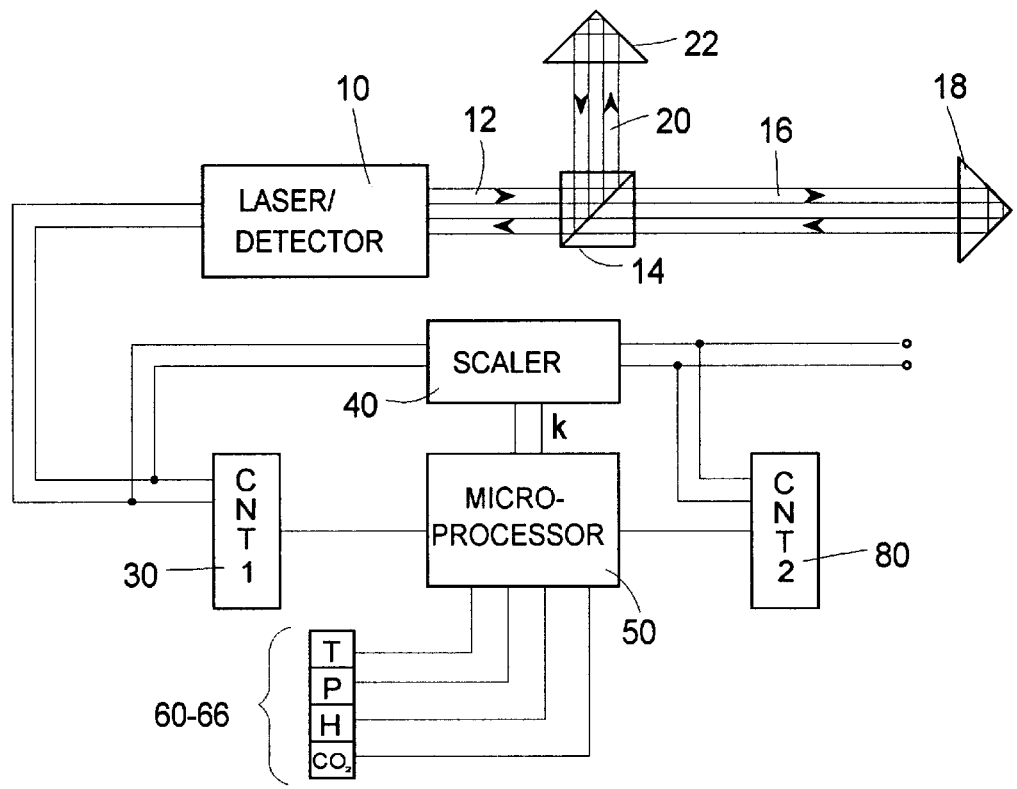
FIG. 1 shows a schematic representation of a system according to a first embodiment of the present invention.

A laser 10 emits a beam 12 of laser light, which is subsequently incident upon a beam splitter 14. A fraction 16 of the beam 12 passes undiverted through beam splitter 14 and is incident upon a measuring retroreflector 18, connected to an object whose displacement relative to the laser is to be measured. A reference beam 20 is reflected by the beam splitter 14, and is incident upon a reference retroreflector 22, whose position is fixed with respect to beam splitter 14. Reflected measuring and reference beams 16, 20 are recombined at beam splitter 14 and are incident upon a plurality of photodetectors provided inside the laser housing. Photodetectors, in conjunction with signal conditioning circuitry (not shown) which is well known in the art per se, generate a series of digital quadrature output pulses. Typically, the output quadrature pulses are sent to a master counter of, e.g. a CNC for a machine too, which generates an incremental count representing displacement of the object to which retroreflector 18 is mounted. In accordance with the present invention a compensation system is provided which generates corrected quadrature pulses for transmission to the master counter, on the basis of the original output pulses, and one or more correction factors.

The output quadrature pulses are sent to a first counter 30 which generates an instantaneous value therefrom. Additionally, the output quadrature pulses are sent to a scaler or multiplier 40. The scaler or multiplier 40 generates, from the output digital quadrature pulses, and a correction or scale factor K output from microprocessor 50, a secondary, and in this example, modified quadrature output. The magnitude of the correction factor K is determined by the microprocessor on the basis of inputs from environmental sensors of one or more of the following types: temperature sensor 60 (of air or a workpiece, for example), pressure sensor 62, humidity sensor 64, and carbon dioxide sensor 66. Further sensors may be provided as desired. The correction factor K may also be determined upon the basis of geometrical error data of, e.g. a machine tool to be calibrated, relating to e.g. straightness or yaw.

The secondary pulses output from the scaler/multiplier 40 is sent to the master counter. Additionally, the output is sent to a second counter 80 which generates an instantaneous value corresponding to the displacement of retroreflector 18 from a datum, as corrected in accordance with the values on the sensors 60-66.

Because the scaler/multiplier 40 is of a finite size (typically 32 bits) the correction of the input quadrature pulses by the scale factor will only accurate to the lowest order bit in the scaler/multiplier 40. Over time, the cumulative effect of errors in the multiplication whose individual magnitude are less than the least significant bit of the scaler/multiplier 40 will be such that the value on counter 80 no longer exactly represents the actual value of displacement of retroreflector 18 relative to the datum. To correct for this, the microprocessor 50 receives input from both the first counter 30 and the second counter 80, and compares the value on the second counter 80 with the product of the scale factor and the value on the first counter 30 (this being the actual displacement value). In the event that the value on counter 80 is not equal to the product of the scale factor K and the value on first counter 30, the microprocessor 50 addresses the scaler/multiplier 40, in order to correct the value on the second counter 80, causing it either to inject further modified pulses into the output thereof, or to omit pulses from the output thereof as appropriate. This modification of the scaler/multiplier 40 output by the microprocessor is thus a controlling of the instantaneous output frequency, i.e., half the time interval between leading edges of adjacent secondary pulse for injection of a pulse, and twice the time interval for omission.

The frequency of the quadrature output pulses is related directly to the speed of movement of the movable retroreflector 20. The maximum permitted frequency of secondary pulses output from the scaler/multiplier 40 is governed by the system receiving the secondary pulses (e.g. the master counter in the CNC of a machine tool). Thus, if the retroreflector 20 is moving at a speed corresponding to the maximum permitted frequency of the scaler secondary pulses, and simultaneously the microprocessor determines that an additional secondary pulse is required to correct the value of second counter 80, this additional secondary pulse cannot be injected until the retroreflector 81 has slowed down to a speed corresponding to half the maximum permitted frequency; whereupon the injection of the additional secondary pulse may occur, instantaneously increasing the frequency once again to the maximum permitted frequency.

Figure 2:
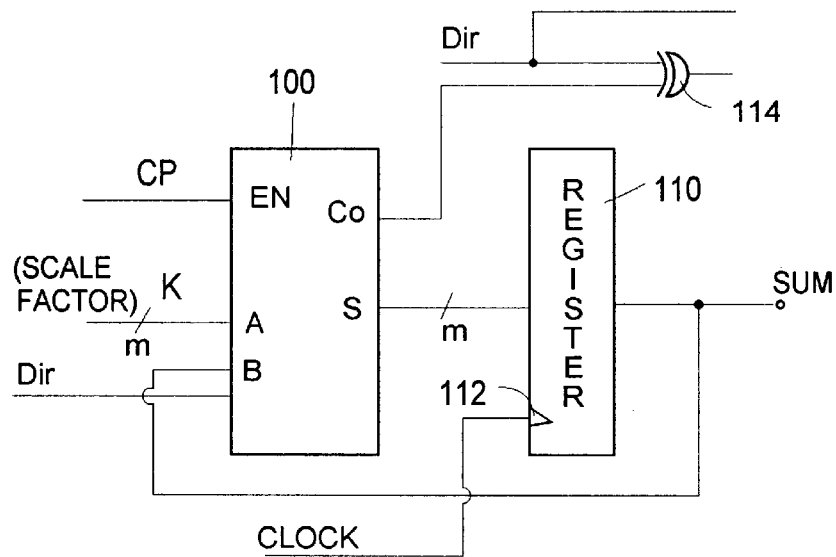
FIG. 2 shows a schematic representation of a component of the system illustrated in FIG. 1.

The scaler/multiplier 40 may be embodied as a suitably programmed EPLD, whose architecture will now be described with reference to FIG. 2. The scaler 40 includes an ADD/SUBTRACT circuit 100 which receives three input signals, tow of which CP, DIR comprise the decoded quadrature output signal. Signal CP is a train of count pulses from which an instantaneous value corresponding to the displacement of the movable retroreflector may be generated, and signal DIR goes either high in the event that the instantaneous total is to be incremented (corresponding to movement of the movable retroreflector 18 in one direction) or low in the event that the instantaneous total is to be decremented (corresponding to movement of the movable retroreflector 18 in the other direction). Additionally, ADD/SUBTRACT circuit 100 receives an m-bit correction factor signal K from microprocessor 50 at input A. ADD/SUBTRACT circuit 100 also receives a further input B, being the output of a register 110. The circuit 100 operates to add (in the event that signal DIR is high) or subtract (in the event that signal DIR is low) the instantaneous values present at the input A and B upon receipt of an enable signal EN (which in this case has the form of a count pulse CP). The result of the addition or subtraction is provided at output 8, which is then closed into register 110 upon receipt of a clock pulse at input 112; the new output of the register then appearing at input B. The circuit generates a carry out signal Co when the value S is equal to $2^{IR}$, which is combined with the DIR signal at exclusive OR gate 114, the output of which is the output of the scaler 40. The ratio of carry out pulses Co to input pulses CP thus corresponds to the scaling ratio, and is determined by the value of the correction factor K; i.e. if $K \neq 2^{IR}$ then the ratio will be 1:1, whereas if K=1, then the ratio will be $1:2^{IR}$.

Figure 3:
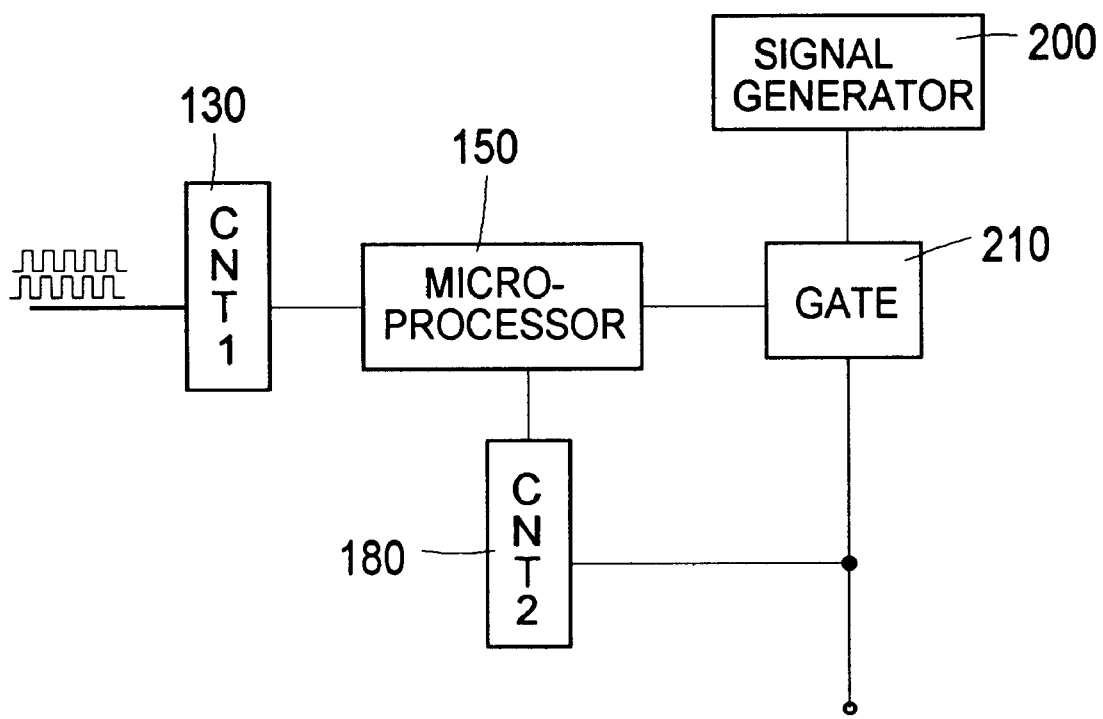
FIG. 3 shows a schematic representation of a second embodiment of system.

An alternative embodiment of the present invention will now be described with reference to FIG. 3, in which the laser measuring apparatus and environmental sensors have been omitted for clarity and simplicity. A first counter 130 receives digital quadrature output pulses directly from the laser measuring system, and generates an instantaneous value therefrom The first counter 130 is also connected to a microprocessor 150. A signal generator 200 generates a continuous stream of secondary digital quadrature pulses at a frequency equal to the maximum permitted frequency of the system receiving the pulses (e.g. a master counter of a CNC not shown). The output of the signal generator 200 is connected, via a gate 20 to the master counter as well as to a second counter 150. The gate 20 is operable to allow the passage of secondary quadrature pulses to the second and master counters from the signal generator 200 upon receipt of a signal from the microprocessor 150. Thus, the gate 210 and microprocessor effectively control the instantaneous frequency at which said secondary pulses are transmitted to he second and master counter. The microprocessor actuates the gate 210 to allow the passage of secondary pulses such that the value on the second counter 180 is equal to the product of the value on the first counter 130, and the instantaneous value of the scale factor K, determined by the microprocessor 150. This can be done in one of two ways.

A first alternative is that the microprocessor uses its internal clock (synchronised to the frequency output of the signal generator 200 such that the signal generator output frequency is a rational of the microprocessor clock frequency) repeatedly to investigate the change in value of the first counter 130 at regular intervals of time. A change in the value on the first counter 130 causes the microprocessor to actuate gate 210 to allow the passage of a number of pulses from the signal generator 200 corresponding to the change in value of the counter 130 modified by the scale factor K. Adjustments may then be made, as with the first embodiment, by reference to the second counter 180, in the manner already described.

In a second alternative the microprocessor is programed such that for each processing of its cycles gate 210 is actuated until the value on counter 180 equals the product of the value on counter 130 and the scale factor K.

One advantageous aspect of the systems described above is that they provide compensation for long term "DC" drift, which is particularly useful where a measuring system is being operated over long periods of time, or over long distances, or in interferometer systems with a large deadpath for example.

Typically a master counter to which the secondary pulses (having the form of quadrature pulses) are sent will incorporate an interpolator; the interpolator causes an increment or decrement to the value of the counter each time one of the secondary quadrature pulses changes state. In the strictest sense, the master counter may thus be said to operate responsive to a series of "edges" as opposed to pulses. The term pulses as used in the present specification is intended to have general applicability, encompassing both pulses and what are more usually known as edges.

We claim:

1. A real-time compensation system for a measuring apparatus, which apparatus generates a series of output pulses corresponding to movement of an object whose displacement is to be measured, the compensation system producing compensated pulses for transmission to a master counter containing a corrected displacement value of the object, the system comprising:

a first counter, which receives the output pulses, and generates therefrom a first incremental value corresponding to an uncorrected is placement of the object relative to a datum;

a processor which receives a sensor signal from at least one sensor, and generates a correction factor based upon a value of the at least one sensor signal;

a secondary pulse generator which generates secondary pulses for transmission to the master counter; and a second counter, which receives the secondary pulses, and generates therefrom a second incremental value corresponding to the corrected displacement of the object relative to the datum, wherein the processor is adapted to calculate the actual displacement of the object from the uncorrected displacement value of the first counter, and the instantaneous value of the at least one correction factor, and (b) to compare the calculated actual displacement with the corrected displacement value of the second counter, and to control an instantaneous frequency at which the secondary pulses are transmitted to the master counter and the second counter, in accordance with the difference, if any, between the calculated actual displacement and the corrected displacement value of the second counter, thereby to equalise the corrected displacement value of the second counter with the actual displacement value.

2. A compensation system according to claim 1 wherein the at least one sensor is an environmental sensor.

3. A compensation system according to claim 1 wherein the at least one sensor is one of a pressure sensor, a humidity sensor, a temperature sensor and a carbon dioxide sensor.

4. A compensation system according to claim 1 wherein the secondary pulse generator is provided by one of a scaler and a multiplier.

5. A compensation system according to claim 4 wherein control of the instantaneous frequency of the secondary pulses occurs by injection of additional secondary pulses, and suppression of pulses output from the scaler/multiplier, as appropriate.

6. A compensation system according to claim 1 wherein the secondary pulse generator is provided by a signal generator which generates a digital pulse train.

7. A compensation system according to claim 6, wherein control of the instantaneous frequency of the secondary pulses is provided by a gate, selectively operable to allow the passage of secondary pulses from the pulse train to the second counter and the master counter, and the processor which controls the gate.

8. A method of compensating an output of an apparatus measuring displacement of an object, wherein the apparatus generates digital output pulses corresponding to movement of the object, the method producing corrected pulses for generating a master count from the output pulses, and comprising the steps of:

generating a first incremental count from the output pulses of the apparatus;

generating a correction factor based on information from at least one sensor;

generating secondary pulses and transmitting the secondary pulses to a master counter;

generating a second incremental count from the secondary pulses which are transmitted;

calculating an actual displacement value of the object from the first incremental count and the correction factor;

comparing the actual displacement value and the second incremental count; and on the basis of the comparison, equalising the second incremental count with the actual displacement value, by controlling an instantaneous frequency at which the secondary pulses are transmitted to form the second incremental and master counts, the secondary pulses that are transmitted thereby providing the corrected pulses.

9. A method according to claim 8 wherein the secondary pulses are generated from a signal generator, and the corrected pulses are provided by selectively allowing the passage of secondary pulses from the signal generator.

10. A method according to claim 8, wherein the secondary pulses are generated by scaling the output pulses by the correction factor.

11. A method according to claim 10 wherein the corrected pulses are provided by injecting additional secondary pulses and suppressing emission of secondary pulses from the scaler as appropriate.

* * * * *